3,263,797
ROLLER CONVEYOR HAVING POWER DRIVEN ROLLERS

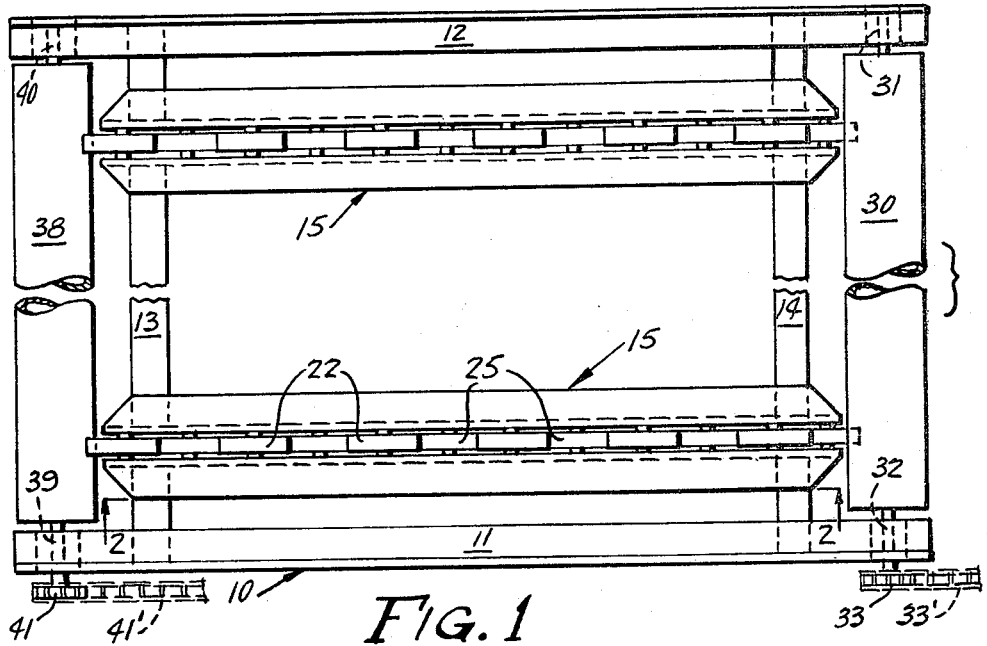
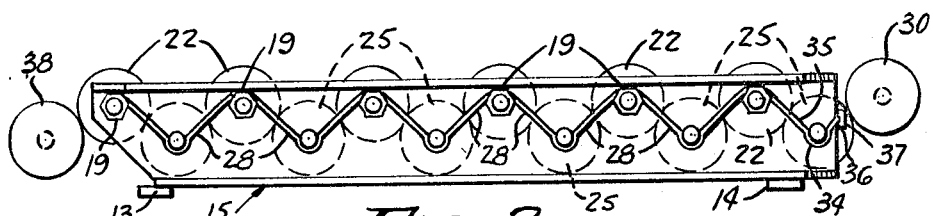
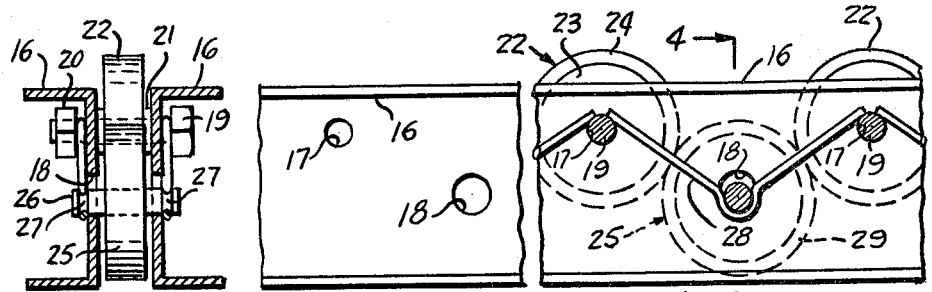
INVENTOR.
HARRY L. LUTES
BY C. Chandlee Pidgeon
AGENT.

Harry L. Lutes, Centerville, Ohio, assignor to Kornylak Corporation, Hamilton, Ohio, a corporation of New Jersey
Filed July 20, 1964, Ser. No. 383,664
7 Claims. (Cl. 198—127)

This invention relates to a roller roller type conveyor having power driven rollers. Roller conveyors are used for handling certain types of loads and are usually of the gravity type. However, under some circumstances, it is not feasible to provide sufficient fall for a gravity conveyor to operate. It has been found convenient to apply power to this type of roller conveyor so that loads may be moved horizontally or even up-grade.

An object of this invention is the provision of a roller way having power driven rollers for moving heavy loads such as loaded pallets or packaged merchandise.

Another object of this invention is the provision of means to transfer torque from a power driven roller to the end roller of a rollerway, and from such end roller to other longitudinally spaced rollers in said rollerway.

A further object of this invention is the provision of a plurality of intermediate movable idler rolls for transferring torque from one roller to another adjacent roller, longitudinally spaced therefrom, in a rollerway.

An additional object of this invention is the provision of a novel spring arrangement for causing idler rolls to engage adjacent rollers of a rollerway to transmit torque from one to the other.

The above and other objects will become apparent from a consideration of the following specification taken in connection with the accompanying drawing which together form a complete disclosure of my invention.

In the drawing, wherein like characters of references indicate like parts throughout the several views:

FIG. 1 is a plan view of a pair of rollerways according to my invention;

FIG. 2 is a side elevation of a rollerway taken on the line 2—2 of FIG. 1;

FIG. 3 is a fragmentary view of a portion of FIG. 2, on a larger scale;

FIG. 4 is a vertical section on the line 4—4 of FIG. 3; and

FIG. 5 is a fragmentary view of the rollerway of FIG. 2 without the rollers or springs.

A unit 10 of a line roller conveyor has a frame including side rails 11, 12 and cross members 13 and 14. The cross members 13 and 14 support a plurality, i.e., two or more substantially parallel rollerways 15, two being shown in FIG. 1. The rollerways 15 comprise a pair of channel members 16. The web of each channel member 16 has a longitudinally extending upper row of holes 17 and a similar lower row of holes 18.

In the holes 17, bolts 19, having nuts 20 and washers 21, support the live or conveying rollers 22. While any suitable roller construction may be used, I prefer to use a roller having a web 23 and a tire 24. The roller as preferred has a built in ball bearing, one race thereof is tubular and is clamped in place by the nut 20 on the bolt 19. The tire 24 is preferably formed of a very tough elastomeric material molded on the web 23.

Rollers 25 are mounted on pins 26 inserted in the holes 18 and having a diameter less than the diameter of the holes 18. Each of the pins 26 has a circumplural groove 27 adjacent either end. In order to cause the rollers 25 with their pins 26 to move toward the adjacent rollers 22 springs 28 are mounted to engage under the grooves 27 and to bear on the washers 21 at the outer faces of the webs of the channel members 16. The pins 26 are thus urged upwardly in the oversize holes 18 to press the rollers 25 firmly against adjacent rollers 22. The rollers 25 may be of any suitable type and may be solid metal or elastomeric material or may have elastomeric tires 29.

Torque may be applied to the rollers 22 of the rollerways 15 by means of a power driven roller 30 mounted in the side frames 11, 12 on trunions 31 and 32. A sprocket 33 mounted on the outer end of the trunion 32 may be connected by a chain 33 to a suitable prime mover or gear box to supply power to the roller 30. The roller 30 is engaged by a roller 25 of the series of idler rollers. In order to cause the end roller 25 to engage both the roller 30 and the adjacent roller 22, a spring 34, somewhat similar to the springs 28, engages under the pin 26 of the roller 25 and has a longer end 35 engaging over a washer 21 on the bolt 19 of the adjacent roller 22 and a shorter end 36 bent at a right angle and engaging in an opening in a block 37 fixed on the channel member 16. In order to improve the drive for the rollers 22, an additional power driven roller 38 is mounted on trunions 39 and 40 in the frames 11 and 12. The roller 38 may be powered in a manner similar to the roller 30, as by means of a sprocket 41 on the trunion 39 and a chain 41.

The frame members 11 and 12 may be supported on any suitable legs or base, not forming any part of my invention.

Having described my invention in a preferred form, I desire it to be understood that various changes and modifications may be made within the skill of the art and the scope of the appended claims.

I claim:

1. In a roller conveyor having a frame and a rollerway mounted on said frame, conveying rollers spaced longitudinally of said rollerway, means for applying torque sequentially to said conveying rollers comprising idler rollers intermediate and engageable with adjacent pairs of said conveying rollers, means mounting said idler rollers for lateral movement comprising enlarged openings in said frame to permit movement of said idler rollers toward and away from said conveying rollers, means urging said idler rollers to engage said conveying rollers and means for driving at least one of said idler rollers.

2. The structure as defined in claim 1 wherein the means for driving at least one of said idler roller comprises a roller mounted on said frame engaging an idler roller and having means for connecting same to a suitable source of power.

3. The structure as defined in claim 2 wherein additional means is provided for transmitting torque to the conveying rollers and comprises a power driven roller mounted in the frame and engaging an end roller of the conveying rollers, and having means for connecting same to a source of power.

4. The structure as defined in claim 1 wherein said rollerway comprises a pair of spaced substantially parallel channel members, said members being allochirally arranged and having mating transverse openings therein and wherein the longitudinally spaced conveying rollers are mounted on bolts passed through the rollers and opposite mating openings in the channel members.

5. The structure as defined in claim 4 wherein the idler rollers are rotatably mounted on pins passing through longitudinally spaced oversize openings permitting the free movement of said idler rollers to and from said conveying rollers.

6. The structure as defined in claim 5 including springs engaging under the pins on which the idler rollers are mounted, and over the bolts on which the conveying rollers are mounted.

7. The structure as defined in claim 1 wherein the means urging the idler rollers toward the conveying rollers comprises springs pushing the axis of an idler roller in a direction substantially normal to a line connecting the axes of the two adjacent conveying rollers.

References Cited by the Examiner

UNITED STATES PATENTS

| | | | |
|---|---|---|---|
| 633,572 | 9/1899 | Cromwell | 198—127 |
| 2,786,578 | 3/1957 | Graff | 193—35 |
| 2,965,374 | 12/1960 | Streeter | 198—127 |
| 3,127,003 | 3/1964 | Goepper | 198—127 |

EVON C. BLUNK, *Primary Examiner.*

RICHARD E. AEGERTER, *Examiner.*